No. 733,173. PATENTED JULY 7, 1903.
J. EDWARDS.
NUT LOCK.
APPLICATION FILED SEPT. 6, 1902.
NO MODEL.
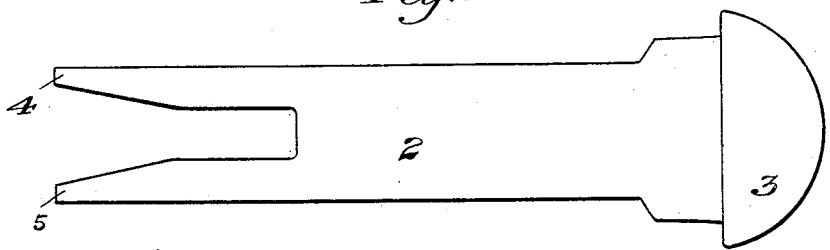
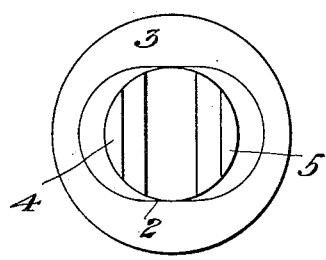 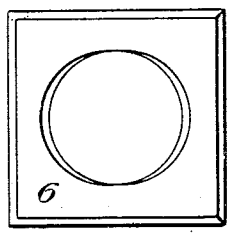 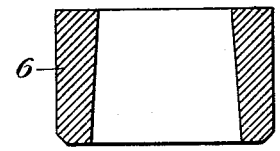
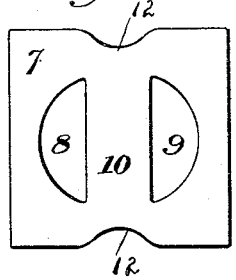 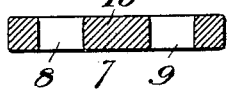 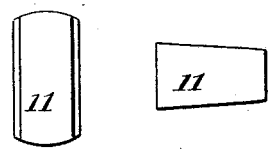
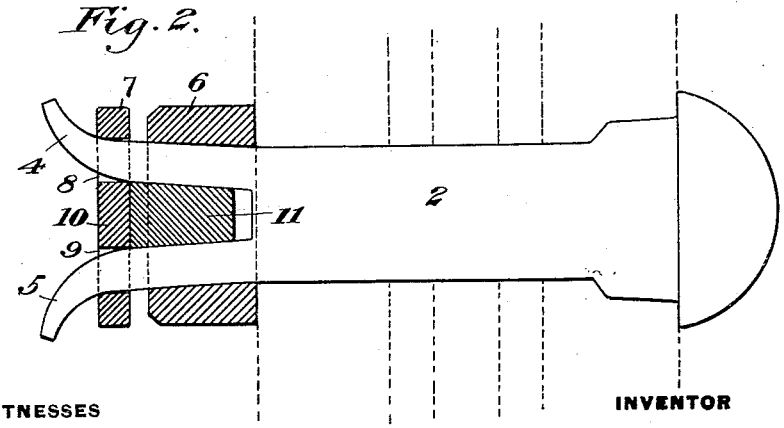
WITNESSES
A. M. Steen
W. F. Stewart
INVENTOR
John Edwards
by James F. Bakewell
his attorney No. 733,173. Patented July 7, 1903.

UNITED STATES PATENT OFFICE.

JOHN EDWARDS, OF HOMESTEAD, PENNSYLVANIA.

NUT-LOCK.

SPECIFICATION forming part of Letters Patent No. 733,173, dated July 7, 1903.

Application filed September 6, 1902. Serial No. 122,288. (No model.)

*To all whom it may concern:*

Be it known that I, JOHN EDWARDS, of Homestead, county of Allegheny, and State of Pennsylvania, have invented a certain new and useful Improvement in Nut-Locks, of which the following is a clear, full, and exact description, reference being had to the accompanying drawings, forming part of this specification, in which—

Figure 1 is a side elevation of my improved bolt. Fig. 2 is a like view showing the nut-lock in position, the parts of the lock being shown in section. Fig. 3 is an end view of the bolt, and Fig. 4 is a face view of the nut. Fig. 5 is a horizontal section of same, and Figs. 6, 7, 8, and 9 are details of the parts of the nut-lock.

My invention relates to an improvement in nut-locks for locking nuts on the ends of bolts, and although it is useful and adapted for use in connection with railway-joints it may be used in any place where it is desirable to lock a nut upon a bolt and to prevent the nut from jarring loose therefrom; and it consists in a threadless bolt and nut and a locking device adapted to spread and lock the forked ends of the bolt.

I will now describe my invention, so that others skilled in the art may manufacture and use the same.

In the drawings, 2 represents a railway-joint bolt, having the usual head 3. The outer end of the bolt, however, instead of being threaded is slotted, forming two projecting arms 4 and 5, with a space between them. This bolt is adapted to be placed through the rail and the fish-bar, as indicated in the drawings.

The nut 6, which may be of the usual external form, has a smooth bore which is somewhat tapered, the bore being smaller at the base of the nut, as is shown in the drawings. This nut is placed over the end of the bolt, the two arms 4 and 5 of the bolt extending beyond the outer face of the nut.

The nut-lock proper consists of a washer or plate 7 and a key or wedge 11. The washer has two openings 8 and 9, adapted to receive and confine the arms 4 and 5 of the bolt. It also has a central web portion 10, which is adapted to engage the expanding-key 11, of wedge form, which I prefer to make separate from the washer 7. The wedge 11 is placed between the two arms 4 and 5 of the bolt. The washer 7 is placed over the end of the bolt, the arms passing through the two openings 8 and 9 in the nut-lock. The nut-lock is then driven home, the wedge causing the arms 4 and 5 to spread, and by a suitable tool these arms are further spread as the washer is forced over the bolt. The wedge 11 also causes the bolt to fill the tapered bore of the nut, and the nut is pressed tightly against the fish-plate or other surface on one side, and the head of the bolt is pressed against the opposite fish-plate or surface on the other side. The tool by which the washer and wedge are forced home is arranged to bend the arms 4 and 5 behind the washer and to hold the nut. Access to the nut is afforded by the marginal notches 12 in the washer. (Shown in Fig. 6.) This firmly secures the lock upon the end of the bolt, so that it cannot be jarred loose.

The advantages of my invention will be appreciated by those skilled in the art.

Having thus described my invention, what I claim, and desire to secure by Letters Patent, is—

1. In a nut-lock, the combination of a bolt, having a forked end, an unthreaded nut adapted to fit over said end, and a washer having openings for the reception of the forked end of the bolt, and a wedge interposed in the forked end of the bolt, whereby the parts are locked.

2. In a nut-lock, the combination of a bolt having a forked end, an unthreaded nut having a tapered bore adapted to fit over said end of the bolt, a washer having openings for the reception of the forked end of the bolt, and a separate wedge interposed in the forked end of the bolt, whereby the parts are locked.

3. In a nut-lock, the combination with a bolt having a forked end, of an unthreaded nut adapted to fit the bolt, a washer having openings arranged to receive the forked end of the bolt, and having other portions cut away to permit access to the outer face of the nut, and a wedge interposed in the forked end of the bolt.

In testimony whereof I have hereunto set my hand.

JOHN EDWARDS.

Witnesses:
A. M. STEEN,
JAMES K. BAKEWELL.